May 14, 1968     P. V. PALMQUIST ET AL     3,382,908
REFLEX-REFLECTIVE TIRES
Filed Nov. 5, 1965
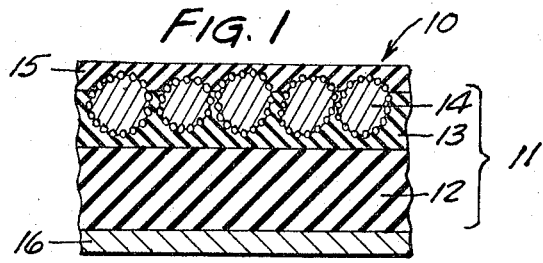
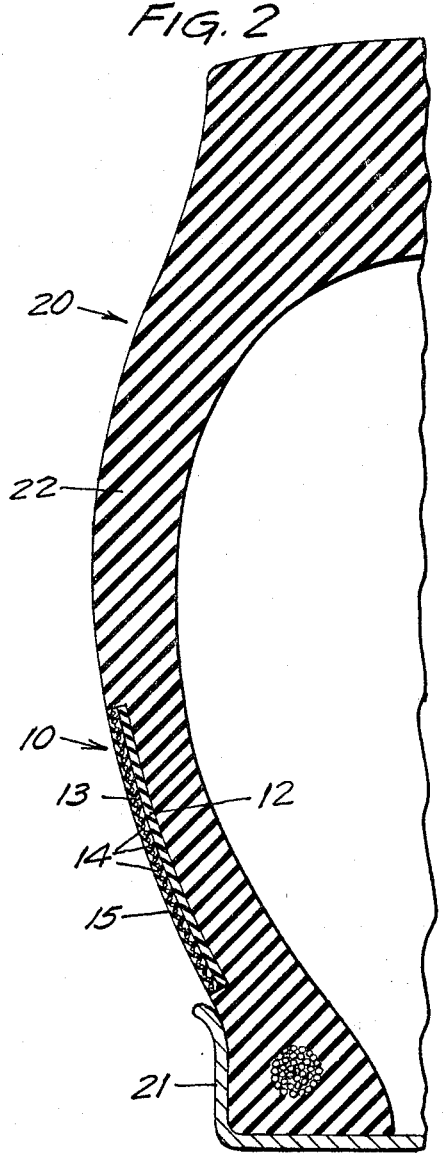
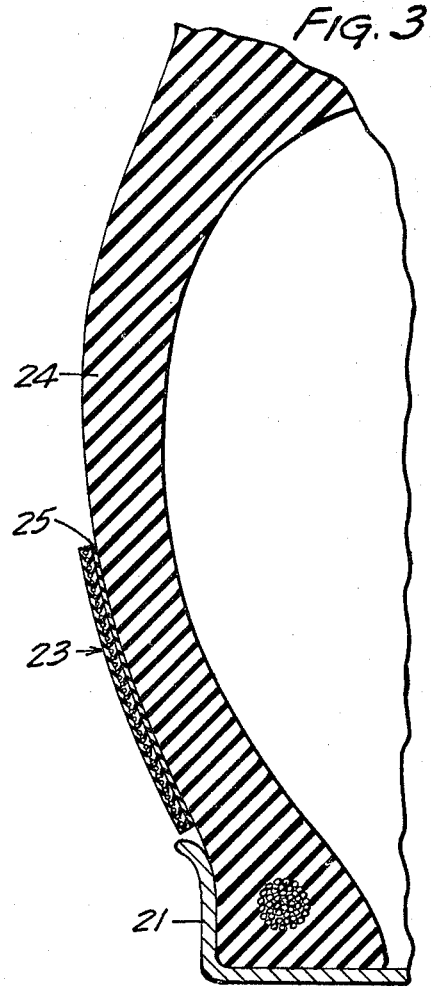
INVENTORS
PHILIP V. PALMQUIST
NELSON JONNES
BY Carpenter, Kinney & Boulter
ATTORNEYS

United States Patent Office 3,382,908
Patented May 14, 1968

3,382,908
REFLEX-REFLECTIVE TIRES
Philip V. Palmquist, Maplewood, and Nelson Jonnes, Stillwater, Minn., assignors to Minnesota Mining and Manufacturing Company, St. Paul, Minn., a corporation of Delaware
Filed Nov. 5, 1965, Ser. No. 506,530
11 Claims. (Cl. 152—353)

ABSTRACT OF THE DISCLOSURE

A tire having a monolayer of reflex-reflective elements partially embedded in an outside sidewall to provide a night-time signal of the location or movement of the tire.

This invention provides pneumatic tires that have reflex light-reflective exterior sidewall portions, particularly tires that have a layer of reflex-reflective elements supported on the tire sidewall, and also provides new materials and methods for forming such tires. When in place on a vehicle and illuminated by oncoming traffic at night time, these tires provide a bright, cone-shaped, substantially coaxial reflection of light back to the source of illumination, with sufficient spreading of the cone of returned light to make it visible to drivers of the oncoming vehicles.

Automobile headlamps are often recessed into the fenders of a car and are designed to send their beams essentially straight ahead. Likewise taillights are constructed with lenses which serve to send their beams directly backwards from the car. For this reason the lights of a car often cannot be adequately seen when approaching the side of the car at night. The reflecting tires of this invention however are readily seen on the side of a car at night from distances of 300 feet or more and therefore provide a previously unfilled need of means to warn the oncoming traffic of the presence of a potential obstruction. An arrangement of the reflective treatment in widely separated dots along the edge of the tire provides a function of attention-getting motion as the tires are rotating adding to the conspicuity of the vehicle.

The new reflex-reflective pneumatic tires are capable of rugged wear without substantial deterioration of their reflective properties. The reflective portion of the tires withstands abrasion by curbs and severe and repeated flexure by travel over uneven roadways, and is not degraded in severe weather conditions. The reflective tire sidewall portion has similar elastomeric properties as the rest of the sidewall so that the tires function as they would without a reflective treatment and so that no point at which destructive forces might develop is built into the tires. The reflective area is located and shaped precisely on the tires and the treatment is accomplished economically, making the appearance of the tires esthetically satisfying and the treatment practicable.

In a preferred embodiment, a novel tire having the utility described comprises a tire casing to which at least one transfer sheet assembly bearing a layer of reflex-reflective elements is strongly adhered during the tire making process. As supplied to the tire builder, this transfer sheet assembly includes an elastomeric support sheet, on the front side of which reflex-reflective elements are partially embedded and permanently bonded, and a flexible cover sheet releasably adhered to the support sheet over the protruding elements. The cover sheet remains releasable even after subjection to heat and high pressure against the support sheet. At least the back outside layer of the support sheet of this preferred structure includes a vulcanizable elastomeric material that is compatible with tire sidewall elastomers and forms under heat and pressure a strong bond therewith. At least the front portion of the sheet in which the reflective elements are embedded includes material having strong adhesion to the material of the elements. The reflex-reflective elements of this assembly are between about 0.025 and 1 millimeter in overall diameter and are embedded in the support sheet to between about 30 and 80 percent of their height.

In the tire mold, according to this preferred practice, the tire casing is shaped around the transfer sheet assembly, with the support sheet being vulcanized as the casing is vulcanized and forming an integral part of the tire sidewall. After removal of the tire from the mold, the cover sheet is peeled back to reveal a reflex-reflective area having the shape established by the dimensions of the sheet assembly.

The invention is further illustrated in the drawings, wherein:

FIGURE 1 is an enlarged vertical cross-section through a portion of a transfer sheet assembly of this invention;

FIGURE 2 is a partial cross-section through a tire embodying a reflex-reflective treatment according to this invention; and FIGURE 3 is a partial cross-section through a tire embodying a different reflex-reflective treatment according to this invention.

In FIGURE 1, a preferred transfer sheet assembly 10 for incorporation in a tire is shown. The assembly includes a support sheet 11 which is comprised of two layers 12 and 13 of elastomeric material, the bottom layer 12 being especially adapted to vulcanization with the tire casing, and the layer 13 being characterized by good specific adhesion to the glass or reflex-reflective elements. (As used here specific adhesion refers to forces of attraction between the materials of two abutting structures and is distinguished from mechanical interlocking of the structures.) Reflex-reflective elements 14, in the form of aggregate consisting of transparent glass beads bonded around a rigid core with minute light reflecting layers under the beads (as, for example, in Palmquist et al., U.S. Patent 3,043,196), are embedded in the layer 13. A flexible cover sheet 15 is releasably adhered over the support sheet 11 and the protruding elements 14 while a removable liner 16, used in the manufacture of the assembly and in the shipment and use of it, is adhered to the back of the bottom layer 12.

FIGURE 2 illustrates a finished tire 20 in which a transfer sheet assembly 10 is incorporated according to this invention. The tire 20, which is shown in place on a tire rim 21, includes a tire casing 22, which is shown to be formed around the sheet assembly 10 under the heat and pressure of the tire mold. Removal of the cover sheet 15 reveals the reflex-reflective surface, which, as shown, is preferably recessed below the exterior surface of the adjacent tire sidewall to avoid undue abrasion of the reflective surface.

The preparation of a transfer sheet assembly as shown in FIGURE 1 and the incorporation of it in a tire as shown in FIGURE 2 is further illustrated by the following preferred example.

Example 1

The layer 13 was first coated on a liner using a material having good specific adhesion to glass that included a reactive mixture of a diglycidyl ether of Bisphenol A and a polyether diamine.

The polyether diamine of this mixture was polytetramethyleneoxide diamine prepared by the reaction of dicationically active polytetramethyleneoxide with ammonia. The specific polytetramethyleneoxide aminated was prepared by the polymerization of a commercial reagent grade, peroxide-free tetrahydrofuran monomer, the reaction being initiated by trifluoromethane sulfonic anhydride. This reaction was carried out in a 95- liter glass lined reactor equipped with a stirrer under about 0.7 kilogram/square centimeter of nitrogen pressure. Tetrahydrofuran in the amount of 79.9 kilograms was first stirred and cooled to 15° C. whereupon 1.63 kilograms of trifluoromethane sulfonic anhydride was added. The subsequent reaction took about 28.5 minutes with a maximum reaction temperature of 38° C.

The amination followed and was performed in a 190-liter stirred stainless steel reacton containing 1.95 kilograms of anhydrous ammonia dissolved in 43.35 kilograms of tetrahydrofuran. The polymerized polytetramethyleneoxide was drained from the 95-liter reactor under pressure through a 2.5 centimeter polyethylene tube into the closed amination kettle which was always under about 2.5 kilograms/square centimeter pressure and which was cooled continuously to about 12° C. After the transfer was completed, in from about two to four minutes, the resulting solution was stirred for one-half hour and then the excess ammonia vented to the atmosphere. The excess tetrahydrofuran and residual ammonia were vacuum stripped off, while the temperature was gradually increased to about 40° C., after which the polyether diprimary diamine produced by the reaction was diluted to about 30 percent solids by the addition of toluene.

To remove the catalyst residue, any suitable strongly basic ion exchange resin may be added to the kettle. A satisfactory specific one is IRA402 sold by the Rohm and Haas Company. Infrared spectra examinations were performed on samples of the kettle contents to test whether the catalyst residue was removed, with the absence of absorption bands at 9.7 and 15.7 microns indicating when purification was complete. Additional ion exchange resin was used until the catalyst was completely removed. The mixture was then filtered and the filtrate vacuum-stripped at temperatures up to 95° C. to bring the product to 100 percent resin.

The resinous product was found to have a number average molecular weight of 10,000, an amine equivalent weight (measured by titration) of 4610, an inherent viscosity in benzene at 25° C. of 0.42, and a viscosity at 65° C. of 49,500 centipoises.

To prepare the polyether diamine-epoxy material of layer 13 this poly (tetramethyleneoxide) diamine in the amount of 100 parts by weight was first mixed and milled at room temperature on a three-roll paint mill with 9.8 parts of carbon black (Peerless) and 100 parts of toluol. To the resulting mixture the following materials were added and the whole mixture stirred.

Material: Parts by weight
   Diglycidyl ether of Bisphenol A having an average epoxide equivalent weight of 190 (Epon 828) _____ 53.1
   N - beta - ammino - gamma - aminopropyl trimethoxy silane (Z-6020, made by Dow-Corning) _____ 2.8
   Tris (2,4,6-dimethylaminomethyl) phenol (DMP-30) _____ 2.65
   Dimethyl polysiloxane oil flow agent (having a viscosity of 350 centistokes) (DC-200 made by Dow-Corning) _____ 1.4

The elastomeric material thus prepared had good glass adhesion as indicated by the following test simulating the conditions of the material's embodiment in a tire. The material was first coated on plate glass and dried. Tire sidewall rubber stock was then laid over the coating, and the overlaid components pressed and heated to cure them. This sample was then peeled back from the glass in an Instron tester. When pulled by a force applied normal to the surface and at a rate of 2.5 centimeters/minute, the sample exhibited an adhesive force of resistance of 4.3 kilograms/centimeter of sample width. The material was found to cure after several days at room temperature or when heated to 90° C. for about 2 hours or to 150° C. for about 20 minutes.

This material was coated on release paper treated with a silicon resin (DC-23 by Dow-Corning) using a bar coater. The solution was applied in a wet thickness of 0.45 millimeter and the coated paper was passed through an oven heated to 65° C. for about 3 minutes to remove only a portion of the solvent.

Reflex-reflective elements 14 were next embedded into this semi-dry coating. The reflective element used was an aggregate of transparent, glass sphere-lenses adhered to rigid glass cores with a minute light reflecting layer underlying the lenses and in optical connection with their back surface. The sphere-lenses, which had an index of refraction of about 1.91, were between about 35 and 75 microns in diameter, and the whole aggregate had an average diameter of about 0.45 millimeter. The aggregate had been treated with a fluorocarbon sizing (such as water-soluble, chlorine-containing chromium coordination complexes of perfluoroalkane - sulfonamido alkylenemonocarboxylic acids) making it oleophobic so that the embedding material would not creep over the top of the elements. The aggregate was cascaded onto the coated, semi-dry solution described above, the excess of the aggregate shaken off, and the web passed through a pair of rubber nip rollers which exerted a gentle force on the web. The web was then passed through an oven heated to 80° C. for 15 minutes. At this time the aggregate was found to be embedded in the coating to about 60 percent of the depth of the aggregate particles.

The aggregate-covered, coated paper was next coated over the aggregate side with silicon rubber (Sylgard-185 by Dow-Corning) to provide the releasable cover sheet 15. The coating bar was set about 0.13 millimeter above the protruding height of the aggregate. After being coated, the laminate web was passed through an oven heated to 90° C. for about 10 minutes to cure the silicon rubber.

A conventional neoprene rubber blend for use as the layer 12 was next prepared using,

| | Grams |
|---|---|
| Polychloroprene (2 - chloro 1,3 - butadiene) (Neoprene W) | 100 |
| Toluol | 450 |
| Antioxidant (Ionox 330) | 2 |
| Magnesium oxide | 4 |
| Zinc oxide | 5 |
| Stearic acid | 0.5 |
| Carbon black (Peerless) | 17.9 |
| Tetramethyl thiuram monosulfide (Thionex) | 1 |
| Diorthotolylguanidine | 0.5 |
| Sulfur | 1 |

This blend was coated in a 0.3 millimeter thickness onto a Holland cloth liner (16 in FIGURE 1) and the coating heated to 65° C. for about 3 minutes to free it of the volatile solvent content. The paper carrier was stripped from the laminate structure described above and discarded and the bared surface laminated to the exposed surface of the neoprene rubber coating. At this stage the epoxy-polyether diamine material of layer 13 had not been heated for a sufficient period of time to be fully cured. When it did subsequently completely cure during storage after completion of the product or in the tire mold, it formed a rubber splitting bond with the neoprene rubber. After the lamination step, the structure was passed through nip rollers. Lastly, this reflex-reflective transfer sheet laminated assembly was cut into smaller assemblies of the desired pattern.

The transfer assemblies were incorporated into tires during the tire making process. After the Holland cloth liner was removed, an assembly was placed, together with a tire carcass of overlaid rubbery layer components, in a tire mold. The transfer assembly was located, with respect to the carcass, so that after the carcass was expanded and shaped in the mold, the transfer assembly would be located according to the desired design on the exterior tire sidewall surface. After expansion of the tire carcass the bared neoprene rubber surface of the transfer assembly was against the exterior tire surface and the silicone rubber cover sheet was against the inside tire mold surface. During the tire molding process, which was a standard one, the tire carcass was heated in the tire mold to about 153° C. under an inflation pressure of about 21 kilograms/square centimeter for about 15 minutes. The finished tire was then removed from the mold. The transfer assembly was found to form a unified part of the vulcanized tire casing, with the tire formed around the assembly but not under the cover sheet. The cover sheet was readily removed to reveal a surface covered by reflex-reflective elements embedded in the tire to about the same depth as when originally embedded in the layer 13.

The above example describes a preferred practice of this invention. However, a variety of other materials have the properties requisite in a useful transfer sheet assembly, and variations in structure that retain the essential structural relationships for providing partially embedded reflex-reflecting elements on a tire are possible with such materials. For example, single-layer support sheets using different materials have been satisfactorily embodied in tires, and other elastomeric materials and materials having good adhesion to reflex-reflective elements are also useful in the multi-layer construction described. Also, it may be expected that materials discovered or prepared in the future will be incorporated in tires in the manner taught by this invention. This invention contemplates the use of all such materials and structural variations as indicated in the remaining discussion.

A preferred tire product, as described in the example, incorporates a reflex-reflective element bearing support sheet in the tire as an integral part of the sidewall. Such a structure has been obtained through including in at least a back outside stratum of the support sheet a strong, tough elastomer that is vulcanizable or curable at the time the tire casing and sheet are placed in the tire mold. The whole support sheet may be a vulcanizable material or a mixture of a vulcanizable material and some other material, or only the back layer may be a vulcanizable material. Many elastomers are suitable, chlorosulfonated polyethylene (Hypalon 20) being especially useful. A layer of adhesive material may also be used, either instead of or in addition to a layer of vulcanizable material. Useful products, as illustrated in FIGURE 3, are obtained by adhering a transfer assembly 23 to a tire casing 24, or to detachable portions of, or inserts for, a tire casing, by an adhesive layer 25 either during or subsequent to the tire molding operation.

Strong, tough, curable elastomeric materials having good specific adhesion to the contacted surface of the reflex-reflective elements are much preferably used between the elements and the rest of the elastomers vulcanized as the tire sidewall. However, reflective treatments using reflex-reflective elements embedded in rubber, such as neoprene, natural, and styrene-butadiene rubber, exhibit useful but less durable properties. Preferably, the embedding material has a specific adhesion to the material of the contacted surface of the elements, as measured by the above test, of at least about one kilogram/centimeter of width. In general, flexibilized epoxy materials provide the desired adhesive properties. The reflex-reflective elements should be embedded in the support sheet to between about 30 and 80 percent, preferably 50 to 70 percent, of their height.

The support sheet 11 may be a single-layer structure of a material that exhibits good specific adhesion to glass and remains vulcanizable or curable until the transfer assembly is placed with a tire casing in a tire mold. The materials of the support sheet should be elastomeric, that is, be flexible, stretchable, and elastic, and have good strength properties. Their elastomeric properties should, generally, be similar to those of the sidewall elastomers; that is, the support sheet 11 should not be so rigid nor so flexible and stretchable as to alter significantly the normal flexing of the tire.

The described reflex-reflective aggregate is preferably used in products of this invention since it reflects light in the direction of the source even though illuminated at a high angle of incidence (measured from the normal to the support sheet surface). For example, reflex-reflective surfaces of this invention, using aggregate, reflect light at an angle of incidence as high as about 90° from normal to the surface of the transfer assembly. Aggregate is also a preferred reflex-reflective element because of the mechanical adhesion developed between it and the support sheet in addition to specific adhesion. Notwithstanding this preference, transparent glass beads are also quite useful in reflex-reflective treatments of the invention, and offer more flexibility in the color of the treatment. Typically, the diameter of aggregate is between about 0.2 and 1 millimeter, and the diameter of beads between about 0.025 and 1 millimeter, though larger sized elements may be used. When beads are used, the bead covered support sheet may be given a corrugated configuration, as by pressure against an appropriately-shaped die in the tire mold to thereby increase the angle at which light is reflected, as compared to a flat surface carrying partially embedded glass beads.

The cover sheet 15 is a much preferred element of transfer assemblies to be incorporated in a tire during the tire molding process, since the cover prevents the rubber of the tire from being pressed over the reflex-reflective elements and preserves the amount by which the elements protrude. The cover sheet need not be removed until after sale of the completed tire to consumers so that the lenticular reflective surface is protected. Other materials than the particular silicone rubber described also serve the desired function. Where the transfer assembly is to be adhered to previously made tires, the cover sheet may be omitted, although it preferably is used even in such cases to preserve the surface appearance of the transfer assembly while being marketed and while being adhesively affixed to a tire.

In the following examples the invention is further illustrated:

Example 2

Silicone rubber (Sylgard–185) to serve as a releasable cover sheet was cast onto 38.5 kilogram, unbleached kraft paper in a 0.13 millimeter thickness. Aggregate of the kind used in Example 1 was cascaded onto the silicone rubber, and the rubber then cured by heating the web for 20 minutes at 90° C. The product was completed by coating a mixture including vulcanizable elastomer and glass-adhesive elastomer over the aggregate covered surface of the silicone rubber, this latter layer serving as a single-layer support sheet. The material coated was prepared by first mixing the following ingredients:

| | Grams |
|---|---|
| A stereospecific styrene-butadiene copolymer (Kraton 101) | 875 |
| Carbon black (Peerless) | 150 |
| Toluol | 3000 |
| Antioxidant (Ionox 330) | 12.5 |

The complete material was formed by mixing the foregoing components into a uniform blend by stirring and then passing the mass three times through a three-roll paint mill. Then the following ingredients were added with stirring to gain a composite blend.

| | Grams |
|---|---|
| Poly (tetramethyleneoxide) diamine prepared as described above | 500 |
| Pentaerythritol ester of rosin (Pentalyn A) | 50 |
| Epon 828 | 132 |
| DMP–30 | 6.25 |
| Toluol | 500 |

The resulting blend, which has a pot life of eight hours, was coated over the aggregate surface of the web using a smoothing bar set 0.5 millimeter above the aggregate. The web was heated 15 minutes at 90° C. to drive off solvent and partially cure the coating.

This laminate was cut into the desired pattern and vulcanized to a tire in a tire mold as described in Example 1.

Example 3

The neoprene rubber blend described in Example 1 was cast onto a double-coated silicone paper (2–60KG–1 of the Daubert Chemical Co.) in a 0.3 millimeter wet thickness and dried 5 minutes at 82° C. The poly (tetramethylene oxide) diamine-based solution coated as layer 13 in Example 1 was next coated over the neoprene rubber with the notched smoothing bar set at 0.25 millimeter, and the web then further dried for 5 minutes at 90° C. to partially drive out solvent.

The reflective elements used were yellow glass beads having an index of refraction of 1.91 and a diameter range of 35 to 75 microns. They had been coated over their entire surface with a bright metallic layer of vapor-deposited aluminum and then sized with fluorocarbon to make them oleophobic. These beads were cascaded onto the laminate web forming a monolayer and floating a little deeper than their equator in the poly (tetramethyleneoxide) diamine-based layer. The sheet was then passed into the oven and cured for 20 minutes at 120° C. From the oven the sheet was carried into a 4 percent aqueous solution of sodium hydroxide for about 2 minutes to etch off the exposed aluminum and then washed in water and dried.

Lately, a reinforcing scrim of nonwoven rayon fibers was laid over the beaded surface of the laminate sheet structure and silicone rubber (Sylgard–185) coated over the scrim and sheet structure with the smoothing bar set at 0.13 millimeter above the beads. The web was then cured 10 minutes at 90° C., after which transfer assemblies, to be embodied in tires in the manner previously described, were cut in the desired shape.

What is claimed is:

1. A pneumatic tire having durable flexible stretchable and elastic reflex-reflective sidewall portions that provide a bright cone-shaped substantially coaxial return of incident light as a night time signal of the location or movement of a vehicle equipped with the tire comprising a tire casing and a monolayer of discrete reflex-reflective elements partially embedded and permanently bonded in the exterior of the casing sidewall, the reflex-reflective elements being embedded in elastomeric material that has elastomeric properties similar to those of the elastomers in the rest of the casing sidewall, has good specific adhesion to the contacted surface of the elements, and is strongly adhered to the rest of the casing sidewall.

2. A pneumatic tire having durable flexible stretchable and elastic reflex-reflective sidewall portions that provide a bright cone-shaped substantially coaxial reflection of incident light as a night time signal of the location or movement of a vehicle equipped with the tire comprising a tire casing and as an integral exterior part of a sidewall thereof an elastomeric support sheet having elastomeric properties similar to those of the elastomers of the rest of the sidewall vulcanized to the rest of the sidewall, and reflex-reflective elements partially embedded in the support sheet and permanently bonded there by material having strong specific adhesion to the elements.

3. A pneumatic tire having durable flexible stretchable and elastic reflex-reflective sidewall portions that provide a bright cone-shaped substantially coaxial reflection of incident light as a night time signal of the location or movement of a vehicle equipped with the tire comprising a tire casing and as an integral exterior part of a sidewall there of an elastomeric support sheet having elastomeric properties similar to those of the elastomers of the rest of the sidewall vulcanized to the rest of the sidewall, the exterior surface of the support sheet being recessed below the adjacent tire sidewall exterior surface, and reflex-reflective elements between about 0.025 and 1 millimeter in diameter partially embedded in the support sheet to between about 30 and 80 percent of their height and permanently bonded there by material having strong specific adhesion to the elements.

4. The tire of claim 3 and a thin cover sheet releasably adhered to the support sheet over the protruding reflex-reflective elements.

5. The tire of claim 3 in which the reflex-reflective elements are transparent spherical beads having light-reflective means disposed over at least a substantial portion of their embedded surface.

6. The tire of claim 3 in which the material bonding the reflex-reflective elements in the support sheet is an elastomeric material including a resin having oxirane functionality.

7. The tire of claim 3 in which the material bonding the elements in the support sheet is an elastomeric material including a resin having oxirane functionality and a poly(tetramethyleneoxide)diamine curing agent.

8. A pneumatic tire having durable flexible stretchable and elastic reflex-reflective sidewall portions that provide a bright cone-shaped substantailly coaxial reflection of incident light as a night-time signal of the location or movement of a vehicle equipped with the tire comprising a tire casing and an elastomeric support sheet strongly adhered to a sidewall of the tire casing, the support sheet having elastomeric properties similar to those of the sidewall elastomers, and reflex-reflective elements between about 0.025 and 1 millimeter in diameter partially embedded and permanently bonded in the support sheet to between about 30 and 80 percent of their height.

9. A pneumatic tire having durable flexible stretchable and elastic reflex-reflective sidewall portions that provide a bright cone-shaped substantially coaxial return of incident light as a night-time signal of the location or movement of a vehicle equipped with the tire comprising a tire casing and a monolayer of discrete reflex-reflective elements between about 0.025 and 1 millimeter in diameter partially embedded to between about 30 and 80 percent of their height and permanently bonded in the exterior of the casing sidewall, the reflex-reflective elements being embedded in elastomeric material that is strongly adhered to the rest of the casing sidewall and has good specific adhesion to the contacted surface of the elements.

10. The tire of claim 9 in which the (a) area of the exterior surface of the tire in which the reflex-reflective elements are embedded is recessed below the surface of the adjacent portions of the tire and (b) the elastomeric material in which the reflex-reflective elements are embedded has a specific adhesion to the contacted surface of the elements of at least one kilogram/centimeter of width.

11. The tire of claim 9 in which the exterior surface of the tire casing in the area carrying the reflex-reflective elements has a corrugated configuration.

References Cited

UNITED STATES PATENTS

| | | | |
|---|---|---|---|
| 2,607,130 | 8/1952 | Pearson | 350—105 |
| 3,253,634 | 5/1966 | De Young | 152—353 |

ARTHUR L. LA POINT, *Primary Examiner.*

Y. P. SCHAEVITZ, C. B. LYONS,
*Assistant Examiners.*